July 7, 1959 P. J. GRANT 2,893,160
SAFETY GUARD FOR INSECTICIDE CONTAINERS
Filed March 13, 1956
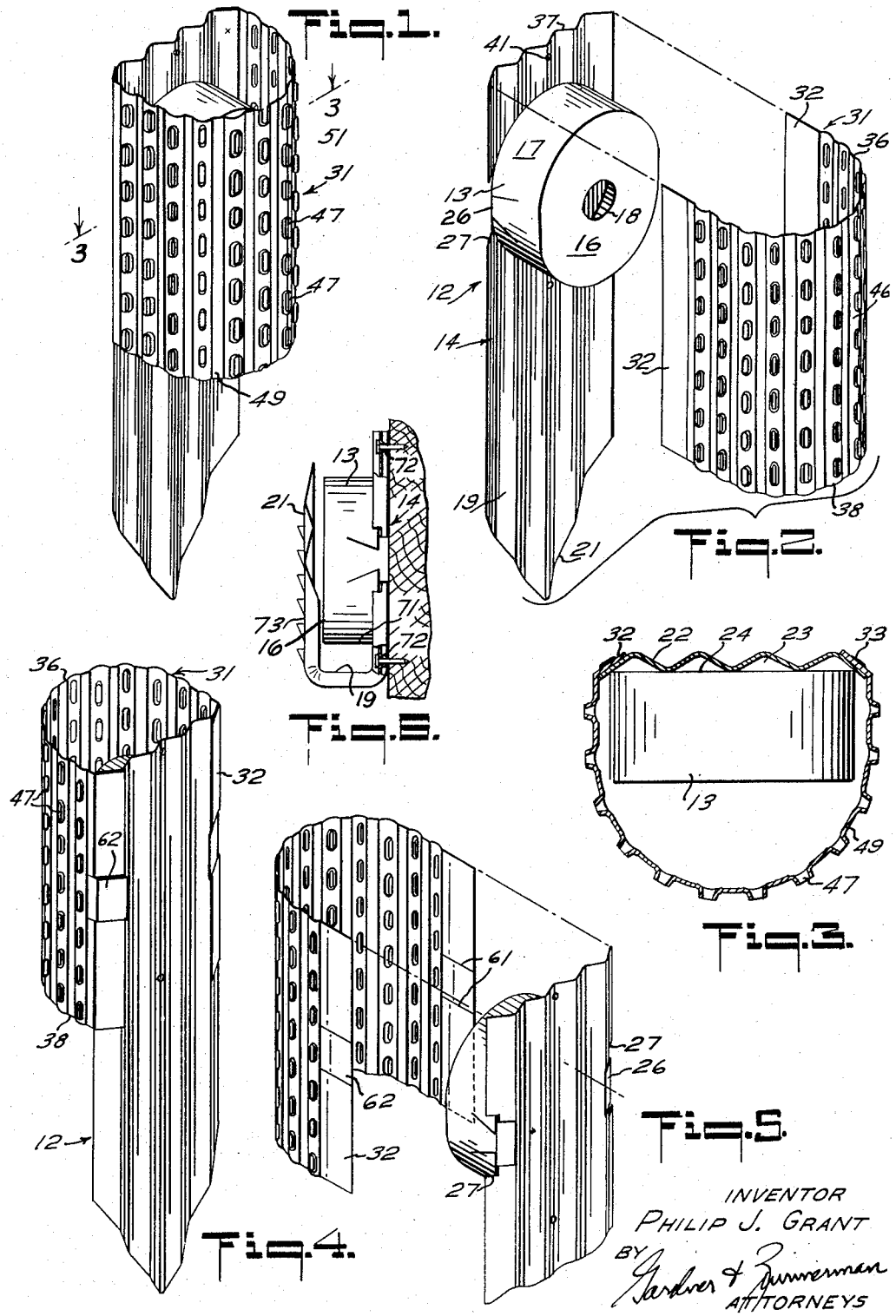
INVENTOR
PHILIP J. GRANT
BY
ATTORNEYS United States Patent Office 2,893,160
Patented July 7, 1959

2,893,160

SAFETY GUARD FOR INSECTICIDE CONTAINERS

Philip J. Grant, Oakland, Calif.

Application March 13, 1956, Serial No. 571,212

8 Claims. (Cl. 43—131)

This invention geenrally relates to the construction of insecticide containers, and is more particularly directed towards an improved guard or safety means adapted for operative installation on such a container.

An insecticide holder or container of the type designed to be supported on the ground or other surface interiorly or exteriorly of a dwelling or other structure is preferably of the type disclosed in my prior patent, No. 2,547,314, issued April 3, 1951, in which the holder generally comprises a receptacle for insecticide material and a standard upon which the receptacle is mounted and by means of which it is normally supported in elevated relation on the ground or other surface. In any insecticide holder of this general type, it is important that the insecticide material be distributed over a relatively large area in such a manner that a maximum number of insects can be fed at the same time, while at the same time precluding access by children or household pets to the poisonous insecticide material. With an arrangement as shown in my above stated prior patent, there remained a relatively large exposed area of the container which could be handled by children or pets and could thereby present a danger in its use.

Accordingly, it is an object of the present invention to provide a guard or shield for an insecticide container, including a receptacle containing insecticide material, which will effectively prevent children and household pets from coming into contact with the bulk of such material.

Another object of the invention is to provide a shield or guard of the character described which will not interfere with the normal functioning of the holder but which presents an exposed surface which acts as a deterrent to children or pets coming into contact therewith.

A further object of the invention is to provide an insecticide holder provided with a shield or guard which permits the draining of rain or other excess water which might otherwise accumulate thereon, and at the same time providing a surface of the type which will attract ants or other insects.

Yet another object of the invention is to provide a combined insecticide holder and guard in which improved fastening means are provided for assembling the standard, insecticide receptacle and guard in unitary relationship.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a perspective view of an insecticide holder provided with the shield or guard of the present invention.

Figure 2 is an exploded perspective view of the structure shown in Figure 1 prior to the installation of the guard on the holder.

Figure 3 is a cross-sectional view taken substantially in the plane indicated by the line 3—3 of Fig. 1.

Figure 4 is a perspective view of a modified form of attaching means between the guard and holder.

Figure 5 is an exploded perspective view of the construction shown in Figure 4.

Figure 6 is a cross-sectional view similar to Figure 3 showing a modified form of guard arrangement.

The guard in the form of the invention here illustrated is adapted for operative installation on an insecticide holder indicated by the numeral 12. Such holder in general comprises a receptacle 13 for receiving a quantity of insecticide paste or the like and a standard 14 on which the receptacle is normally supported in elevated relation upon the ground or other surface. As will be understood, the receptacle 13 may receive an insecticide material of a toxic and gelatinous nature arranged in the form of a semi-solid mass when contained in the receptacle and is preferably partially water soluble to permit small portions to be dissolved such as when the holder is exposed to rain, a water spray or the like.

Receptacle 13 may be formed as a stamping and includes an end wall 16, a peripheral side wall 17 and an open end, and wall 16 is provided with a central aperture 18 through which insects may crawl to gain access to the insecticide material within the receptacle. The open end of the receptacle is adapted to be positioned against one surface 19 of the standard, the latter preferably including a thin strip of sheet metal with the lower pointed end 21 being adapted for insertion into the ground or between other supporting members. As will be noted, the strip includes a plurality of corrugations 22 extending longitudinally thereof, whereby as will be seen from Figure 3, there are a plurality of passages 23 between the surface 19 and the peripheral edge 24 which surrounds the open end of the receptacle. As illustrated, the receptacle is provided with a pair of diametrically opposed tabs 26 which are adapted to be seated in a notch 27 formed along the outer edge portions of the standard adjacent the top thereof. By deforming the tabs 26, the receptacle may be mounted on the standard and in this connection it will be noted that the outermost corrugations forming the longitudinally extending edges of the standards are directed towards the receptacle so that a minimum of bending is required of the tabs 26 to secure the receptacle in place on the standard.

With a structure such as that above described, it will be appreciated that as the toxic insecticide material, upon dissolving or due to partial evaporation, may pass along the corrugations, and by virtue of the central opening 18 in the receptacle, it is possible for pets or children to come into contact with this poisonous material. In accordance with the present invention means are provided to preclude such accidental engagement with the poison, and as here illustrated a guard or shield 31 is provided which serves to effectively cover the main portion of exposed insecticide material. Guard 31 may likewise be formed of a metal stamping, and is deformed to provide a generally U-shaped configuration which, when installed on the standard as shown in the drawing, serves to form a complete enclosure extending circumferentially around the receptacle and the portions of the standard immediately above and below the receptacle. As shown in Figures 1 through 3, the longitudinally extending edges 32 which comprise the distal end of the guard legs, may be deformed around the outermost corrugations of the standard and then spot welded as shown at 33 or otherwise secured to the standard. It will be also seen that the upper edge 36 of the guard is substantially coterminous with the upper edge 37 of the standard and as the receptacle 13 is positioned subjacent said edge 37, the entire receptacle will be covered by virtue of the lower edge 38 of the guard extending for a substantial distance below the lower peripheral portion of the receptacle.

While the guard is open at the top and bottom so as to define a continuous longitudinally extending passage between the standard and guard, it would be difficult if not impossible for a child or pet to engage the receptacle and the poison therein and such an opening permits passage of rain water or a spray of water therethrough which assists in dissolving the insecticide material. As the standard is adapted to be inserted in the ground or other surface, the lower edge 38 will act as a stop member for such engagement and in this manner, upon such insertion, the entire unit will be substantially encompassed and in a safe position to be left in the vicinity of children or pets. Also, the interconnection of the ends 32 of the guard with the edge portions of the standard will substantially strengthen and make the latter more rigid. Where the standard is not to be inserted in the ground suitable nail apertures 41 may be provided along the standard length for mounting the standards on other supports.

While an arrangement such as that just described would be quite effective in preventing contact of the insecticide material, it is preferable that additional means be provided on the guard to act as a deterrent to even contacting the guard surface and accordingly, the outermost surface 46 of the guard is roughened in any suitable manner so that when a child or pet engages the same he will be immediately cognizant of the rough surface. The roughness may be provided by punching a plurality of apertures 47 through the guard over substantially the entire area thereof and as will be apparent from the drawing such apertures may be made by deforming the guard material outwardly so as to provide a large number of generally rectangular openings with all of the openings aligned in a series of longitudinally extending channels. With this arrangement, water coming in contact with the guard will readily run off in the channel portions 49 intermediate each row of apertures and thereby prevent the accumulation of water thereon. It should also be pointed out that by virtue of the rough surface, it has been found that ants and other insects are more readily attracted to the unit since numerous insects like to crawl in and about roughened apertured surfaces. As illustrated, the upper edge 36 may be spaced from any of the individual apertures 47 but where not possible, as indicated at 51, the metal upon being cut should be deformed inwardly so that the slit or aperture will not be left open adjacent such upper or lower edge of the guard.

Accordingly, it will be readily appreciated that while the guard of the present invention is extremely simple in construction and installation on the insecticide container it fulfills a definite need in providing a safety feature for otherwise poisonous insecticide containers.

In Figures 4 and 5 a slightly modified form of guard mounting means is disclosed and is particularly adapted for use where the standard is provided with the side notches 27 for receiving the tabs 26 of the insecticide containing receptacle. In this embodiment, the deformable end poritons 32 of the guard are provided with a pair of slits 61 medially of the length of the portion 32 so as to provide an auxiliary tab 62 on the guard. This tab 62 is adapted to be inserted into notch 27 and in overlapping relationship to the receptacle tab 26 whereby the guard will be readily retained on the standard without the necessity of spot welding or using other more conventional securing means.

In Figure 6 another modified form of insecticide container is disclosed in which the strip itself provides the safety or guard for preventing access to the material within the receptacle. As here shown the receptacle 13 is attached to the upper portion of strip 14 in the same manner as previously discussed. However, it will be noted that substantially immediately subjacent the lower edge 71 of the receptacle the strip 14 is bent into generally U-shaped configuration whereby the end portion 19 thereof overlies the receptacle end wall 16 and the central aperture therein. To support the container suitable apertures 72 may be utilized whereby the strip may be nailed to a supporting surface and then deformed in the manner stated. Also, if desired, the exposed surface 73 of the strip may be roughened as in the case of the guards discussed in connection with the main embodiment of the invention.

What is claimed is:

1. In a device of the character described, a supporting standard of generally strip-like configuration, a receptacle adapted to contain a quantity of insecticide material positioned adjacent one surface of said standard and extending outwardly therefrom, means for mounting said receptacle on said standard, and a guard having a pair of legs and a curvate portion interconnecting said legs, said legs having end portions adapted for fixed engagement with longitudinally extending peripheral edge portions of the surface of said standard remote from said receptacle engaging surface.

2. Apparatus as set forth in claim 1 in which said means for securing said receptacle to said standard includes notch portions on opposite edge portions of said standard, and tab means extending axially from said receptacle and deformable through said notch portions to engage rear surface portions of the standard.

3. In an insecticide holder, a longitudinally extending strip of generally rectangular configuration, a receptacle of substantially the same width as said strip having end and side walls and an open end and being positioned on the front surface of said strip with the open end thereof abutting and being covered by said strip, a longitudinally extending guard member of generally U-shaped cross-sectional form, said guard member being mounted on said standard with the longitudinal axis thereof in parallel relationship to the longitudinal axis of the standard, deformable means at the distal ends of said guard and deformable about rear surface peripheral portions of said standard.

4. Apparatus as set forth in claim 3 in which said standard is provided with a pair of notches along the peripheral edge portions thereof, said receptacle having a pair of deformable tabs insertible through said notches and engageable with rear surface portions of said standard, and means defining a tab in said end portions of said guard member engageable through said notch in overlapping relationship to said receptable tabs.

5. A device of the character described comprising a generally flat standard, an insecticide containing receptacle secured to one surface of said standard and having an end wall and side walls with the side wall being of substantially the same width as said standard, a guard member extending longitudinally of said standard and having opposed edge portions engageable with opposed peripheral edge portions of said standard and a medial portion disposed in spaced opposed relationship to the end wall of said receptacle, the length of said standard being greater than the longitudinal extent of said receptacle, and means for securing said guard to said standard in symmetrical relation to said recaptacle.

6. Apparatus as set forth in claim 5 in which the outer surface of said guard is provided with a plurality of roughened elements.

7. Apparatus as set forth in claim 6 in which a plurality of apertures are provided through said guard, said apertures being constructed and arranged so as to provide outwardly extending portions thereof, whereby a plurality of said roughened elements are formed.

8. Apparatus as set forth in claim 7 in which said apertures are of generally rectangular form and are arranged in longitudinally extending columns.

References Cited in the file of this patent

UNITED STATES PATENTS

| | | |
|---|---|---|
| 1,744,022 | Davis | Jan. 14, 1930 |
| 2,205,125 | Rose | June 18, 1940 |
| 2,293,919 | Rabe | Aug. 25, 1942 |
| 2,480,724 | Feussner | Aug. 30, 1949 |
| 2,547,314 | Grant | Apr. 3, 1951 |